United States Patent
Ishii et al.

(10) Patent No.: US 10,759,926 B2
(45) Date of Patent: Sep. 1, 2020

(54) POLYMER LATEX PRODUCTION METHOD

(71) Applicant: ZEON CORPORATION, Tokyo (JP)

(72) Inventors: Hidetake Ishii, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 109 days.

(21) Appl. No.: 16/071,921

(22) PCT Filed: Jan. 26, 2017

(86) PCT No.: PCT/JP2017/002704
§ 371 (c)(1),
(2) Date: Jul. 23, 2018

(87) PCT Pub. No.: WO2017/135146
PCT Pub. Date: Aug. 10, 2017

(65) Prior Publication Data
US 2019/0031865 A1   Jan. 31, 2019

(30) Foreign Application Priority Data

Feb. 3, 2016   (JP) .................................. 2016-018716

(51) Int. Cl.
| | |
|---|---|
| C08L 9/10 | (2006.01) |
| B29C 41/14 | (2006.01) |
| C08J 3/07 | (2006.01) |
| C08K 5/375 | (2006.01) |
| C08F 236/10 | (2006.01) |
| C08J 5/02 | (2006.01) |
| C08F 297/04 | (2006.01) |
| C08L 9/00 | (2006.01) |
| C08K 3/30 | (2006.01) |
| C08F 136/08 | (2006.01) |
| C08K 5/13 | (2006.01) |
| C08L 53/00 | (2006.01) |
| C08K 5/00 | (2006.01) |
| B29C 41/00 | (2006.01) |
| C08L 53/02 | (2006.01) |
| B29K 105/00 | (2006.01) |

(52) U.S. Cl.
CPC .............. *C08L 9/10* (2013.01); *B29C 41/003* (2013.01); *B29C 41/14* (2013.01); *C08F 136/08* (2013.01); *C08F 236/10* (2013.01); *C08F 297/04* (2013.01); *C08J 3/07* (2013.01); *C08J 5/02* (2013.01); *C08K 3/30* (2013.01); *C08K 5/00* (2013.01); *C08K 5/13* (2013.01); *C08K 5/375* (2013.01); *C08L 9/00* (2013.01); *C08L 53/00* (2013.01); *C08L 53/02* (2013.01); *B29K 2105/0064* (2013.01); *C08J 2309/10* (2013.01); *C08J 2353/00* (2013.01); *C08L 2201/08* (2013.01); *C08L 2201/52* (2013.01)

(58) Field of Classification Search
CPC combination set(s) only.
See application file for complete search history.

(56) References Cited

U.S. PATENT DOCUMENTS

| | | | |
|---|---|---|---|
| 3,305,508 | A | 2/1967 | La Heij et al. |
| 3,379,667 | A | 4/1968 | Pampus et al. |
| 2010/0204397 | A1 | 8/2010 | Kobayashi et al. |
| 2015/0087761 | A1 | 3/2015 | Satoh et al. |

FOREIGN PATENT DOCUMENTS

| | | |
|---|---|---|
| EP | 2980127 A1 | 2/2016 |
| FR | 1387443 A | 1/1965 |
| GB | 893066 A | 4/1962 |
| JP | 2012-062487 A | 3/2012 |
| JP | 2015-193685 A | 11/2015 |
| WO | 2008/117620 A1 | 10/2008 |
| WO | 2013/099501 A1 | 7/2013 |
| WO | 2014/157034 A1 | 10/2014 |

OTHER PUBLICATIONS

Aug. 7, 2018 International Preliminary Report on Patentability issued in International Patent Application No. PCT/JP2017/002704.
Apr. 18, 2017 International Search Report issued in International Patent Application No. PCT/JP20171002704.
Jul. 31, 2019 European Search Report issued in European Patent Application No. 17747304.8.

*Primary Examiner* — Peter D. Mulcahy
(74) *Attorney, Agent, or Firm* — Oliff PLC

(57) ABSTRACT

A polymer latex, including a polymerization step of polymerizing a monomer in organic solvent to thereby obtain polymer solution of synthetic polyisoprene and/or styrene-isoprene-styrene block copolymer, antioxidant addition step of adding antioxidant to the polymer solution of synthetic polyisoprene and/or styrene-isoprene-styrene block copolymer at proportion of 0.01-1.00 parts by weight per 100 parts by weight of the synthetic polyisoprene and/or styrene-isoprene-styrene block copolymer, and emulsification step of emulsifying the polymer solution which the antioxidant is added, in water in the presence of a surfactant, to thereby obtain polymer latex, wherein the emulsification performs in the emulsification step so the ratio D75/D25 of the volume particle size D75 at a cumulative frequency of 75% to the volume particle size D25 at a cumulative frequency of 25% of a particle of the synthetic polyisoprene and/or styrene-isoprene-styrene block copolymer included in the polymer latex is 1.90 or more and 2.30 or less.

7 Claims, No Drawings

POLYMER LATEX PRODUCTION METHOD

TECHNICAL FIELD

The present invention relates to a method for producing a polymer latex that is excellent in emulsification stability and that can provide a dip molded article high in tensile strength.

BACKGROUND ART

It has been conventionally known that a dip molded article for use in contact with the human body, such as a nipple, an air ball, a glove, a balloon and a sack, is obtained by dip molding of a latex composition containing a latex of natural rubber. A latex of natural rubber, however, contains a protein causing an allergy symptom in the human body, and thus is problematic in terms of use in a dip molded article that is in direct contact with the mucous membrane or organs of a living body. Therefore, studies about use of not a latex of natural rubber, but a latex of synthetic polyisoprene or styrene-isoprene-styrene block copolymer have been increasingly made (Patent Document 1).

For example, Patent Document 1 discloses a composition for dip molding, containing a latex of synthetic polyisoprene and/or a styrene-isoprene-styrene block copolymer having a weight average molecular weight of 10,000 to 5,000,000, and a sulfur-based vulcanizing agent and a vulcanization accelerator. According to the composition for dip molding described in Patent Document 1, a dip molded article reasonably improved in tensile strength is obtained. Tensile strength not sufficient, however, may be caused depending on the intended use, and a further improvement in the tensile strength has been thus demanded.

RELATED ART

Patent Document

Patent Document Japanese Patent Laid-Open No. 2012-62487

SUMMARY OF THE INVENTION

Problem to be Solved by the Invention

The present invention has been made in view of such circumstances, and an object thereof is to provide a polymer latex that is excellent in emulsification stability and that can provide a dip molded article high in tensile strength.

Means for Solving the Problem

The present inventors have made intensive studies in order to achieve the above object, and as a result, have found that the above object can be achieved by the following: a predetermined amount of an antioxidant is added to a polymer solution of synthetic polyisoprene and/or a styrene-isoprene tyrene block copolymer obtained by solution polymerization and thereafter the polymer solution is emulsified in water in the presence of a surfactant without coagulation to thereby obtain a polymer latex, and the ratio D75/D25 of the volume particle size D75 at a cumulative frequency of 75% to the volume particle size D25 at a emulative frequency of 25% of a particle of the synthetic polyisoprene and/or styrene-isoprene-styrene block copolymer included in the polymer latex is controlled to a predetermined range in providing of such a polymer latex; thereby leading to completion of the present invention.

That is, according to the present invention, there is provided a method for producing a polymer latex, including:

a polymerization step of polymerizing a monomer in an organic solvent to thereby obtain a polymer solution of synthetic polyisoprene and/or styrene-isoprene-styrene block copolymer;

an antioxidant addition step of adding an antioxidant to the polymer solution of synthetic polyisoprene and/or a styrene-isoprene-styrene block copolymer at a proportion of 0.01 to 1.00 parts by weight per 100 parts by weight of the synthetic polyisoprene and/or styrene-isoprene-styrene block copolymer; and an emulsification step of emulsifying the polymer solution to which the antioxidant is added, in water in the presence of a surfactant, to thereby obtain a polymer latex; wherein the emulsification is performed in the emulsification step so that a ratio D75/D25 of a volume particle size D75 at a cumulative frequency of 75% to a volume particle size D25 at a cumulative frequency of 25% of a particle of the synthetic polyisoprene and/or styrene-isoprene-styrene block copolymer included in the polymer latex is 1.90 or more and 2.30 or less.

The polymerization of the monomer is preferably performed by use of an alkyllithium polymerization catalyst.

A phenol-based antioxidant and a thiobisphenol-based antioxidant are preferably used in combination as the antioxidant.

A weight ratio "phenol-based antioxidant:thiobisphenol-based antioxidant" of amounts of the phenol-based antioxidant and the thiobisphenol-based antioxidant used is preferably 60:40 to 95:5.

The surfactant is preferably sodium rosinate and/or potassium rosinate.

In addition, according to the present invention, there is provided a method for producing a latex composition, including a step of adding a crosslinking agent to a polymer latex obtained by the production method.

Furthermore, according to the present invention, there is provided a method for producing a dip molded article, including a step of dip molding a latex composition obtained by the production method.

Effects of Invention

According to the present invention, there can provide a polymer latex that is excellent in emulsification stability and that can provide a dip molded article high in tensile strength, and a dip molded article that is obtained using such a polymer latex and that has a high tensile strength.

DESCRIPTION OF EMBODIMENTS

The production method of the present invention includes:

a polymerization step of polymerizing a monomer in an organic solvent to thereby obtain a polymer solution of synthetic polyisoprene and/or a styrene-isoprene-styrene block copolymer;

an antioxidant addition step of adding an antioxidant to the polymer solution of synthetic polyisoprene and/or a styrene-isoprene-styrene block copolymer at a proportion of 0.01 to 1.00 parts by weight per 100 parts by weight of the synthetic polyisoprene and/or styrene-isoprene-styrene block copolymer; and an emulsification step of emulsifying the polymer solution to which the antioxidant is added, in water in the presence of a surfactant, to thereby obtain a polymer latex.

In the production method of the present invention, the emulsification is performed in the emulsification step so that the ratio D75/D25 of the volume particle size D75 at a cumulative frequency of 75% to the volume particle size D25 at a cumulative frequency of 25% of a particle of the synthetic polyisoprene and/or styrene-isoprene-styrene block copolymer included in the polymer latex is 1.90 or more and 2.30 or less.

Polymerization Step

The polymerization step in the production method of the present invention is a step of polymerizing a monomer in an organic solvent, to thereby obtain a polymer solution of synthetic polyisoprene and/or a styrene-isoprene-styrene block copolymer.

First, a case where the polymer solution of synthetic polyisoprene is obtained in the polymerization step in the present invention is described.

With respect to the polymer solution of synthetic polyisoprene produced in the polymerization step of the production method of the present invention, the synthetic polyisoprene included may be a homopolymer of isoprene or may be obtained by copolymerization with other ethylenically unsaturated monomer copolymerizable with isoprene. The content of the isoprene unit in the synthetic polyisoprene is preferably 70% by weight or more, more preferably 90% by weight or more, further preferably 95% by weight or more, particularly preferably 100% by weight (homopolymer of isoprene) based on the total monomer unit from the viewpoint that a flexible dip molded article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (meth)acrylate (which means "methyl acrylate and/or methyl methacrylate"; hereinafter, the same is true on ethyl (meth)acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

In the polymerization step of the production method of the present invention, the polymer solution of synthetic polyisoprene can be obtained by, for example, solution polymerization of a monomer including isoprene and other ethylenically unsaturated monomer copolymerizable therewith, if necessary used, in an organic solvent by use of an alkyllithium polymerization catalyst such as n-butyllithium or sec-butyllithium. In particular, according to the present invention, the alkyllithium polymerization catalyst is desirably used to perform polymerization because the polymerization conversion rate can be preferably thus allowed to be 97% by weight or more, more preferably 99% by weight or more, thereby allowing the amount of the remaining monomer to be reduced, and therefore the amount of the remaining monomer in the resulting emulsion can be decreased even in the case where emulsification is directly made without undergoing of any step such as coagulation and re-dissolution for removal of the remaining monomer.

The organic solvent may be any solvent that is inert to polymerization reaction, and examples thereof can include aromatic hydrocarbon solvents such as benzene, toluene and xylene; alicyclic hydrocarbon solvents such as cyclopentane, cyclopentane, cyclohexane and cyclohexene; aliphatic hydrocarbon solvents such as pentane, hexane and heptane; and halogenated hydrocarbon solvents such as methylene chloride, chloroform and ethylene dichloride. Among them, alicyclic hydrocarbon solvents or aliphatic hydrocarbon solvents are preferable, and n-hexane and cyclohexane are particularly preferable. The amount of the organic solvent used is preferably 250 to 2000 parts by weight, more preferably 400 to 1250 parts by weight per 100 parts weight of the monomer for use in polymerization.

The polymerization temperature in solution polymerization of the monomer including isoprene and other ethylenically unsaturated monomer copolymerizable therewith, if necessary used, is preferably 40 to 80° C., more preferably 45 to 75° C.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene is preferably 70% by weight or more, more preferably 72% by weight or more, further preferably 75% by weight or more based on the total isoprene unit from the viewpoint of an enhancement in tensile strength of the resulting dip molded article.

The weight average molecular weight (Mw) of the synthetic polyisoprene is preferably 100,000 to 1,200,000, more preferably 150,000 to 1,100,000, further preferably 200,000 to 1,000,000 in terms of standard polystyrene by gel permeation chromatography analysis. The weight average molecular weight of the synthetic polyisoprene can be in the above range, thereby not only enhancing the tensile strength of the resulting dip molded article, but also allowing the polymer solution of synthetic polyisoprene to have a proper viscosity in emulsification in an emulsification step described below while allowing the content rate of the synthetic polyisoprene included in the solution to be relatively high, to thereby allow an emulsification step described below to be properly performed at a high productivity.

The molecular weight distribution (Mw/Mn) of the synthetic polyisoprene is preferably 1.0 to 2.6, more preferably 1.0 to 2.4, further preferably 1.0 to 2.2. The molecular weight distribution of the synthetic polyisoprene can be in the range to thereby suppress an increase in the viscosity of the polymer solution of synthetic polyisoprene even in the case of allowing the weight average molecular weight to be relatively high, consequently allowing the polymer solution of synthetic polyisoprene to have a proper viscosity in emulsification in an emulsification step described below, while allowing the content rate of the synthetic polyisoprene included in the solution to be relatively high, to thereby perform an emulsification step described below at a high productivity. Herein, the molecular weight distribution (Mw/Mn) can be determined from the above-mentioned weight average molecular weight (Mw) and the number average molecular weight (Mn) in terms of standard polystyrene by gel permeation chromatography analysis.

The polymerization method in the case of obtaining a polymer solution of a styrene-isoprene-styrene block copolymer in the polymerization step in the present invention is not particularly limited, and such a polymer solution can be obtained by block copolymerization of isoprene and styrene in an organic solvent by use of an alkyllithium polymerization catalyst such as n-butyllithium or sec-butyl lithium. The organic solvent and the polymerization temperature here used in the polymerization may be the same as in the case of obtaining the above-mentioned polymer solution of synthetic polyisoprene. Also in this case, the alkyllithium polymerization catalyst is desirably used to perform polymerization because the polymerization conversion rate can be preferably thus allowed to be 97% by weight or more, more preferably 99% by weight or more, thereby allowing the amount of the renaming monomer to be reduced, and therefore the amount of the remaining monomer in the resulting emulsion can be decreased even in the case where emulsification is directly made without undergoing of any step such as coagulation and re-dissolution for removal of the remaining monomer.

In the polymer solution of a styrene-isoprene-styrene block copolymer, the content of the styrene unit in the styrene block in the styrene-isoprene-styrene block copolymer included is preferably 70 to 100% by weight, more preferably 90 to 100% by weight, further preferably 100% by weight based on the total monomer unit.

Herein, the content ratio of the styrene unit and the isoprene unit in the styrene-isoprene-styrene block copolymer is usually in the range of 1:99 to 90:10, preferably 3:97 to 70:30, more preferably 5:95 to 50:50, further preferably 10:90 to 30:70 as the weight ratio of "styrene unit:isoprene unit".

The weight average molecular weight (Mw) of the styrene-isoprene-styrene block copolymer is preferably 50,000 to 500,000, more preferably 70,000 to 400,000, further preferably 100,000 to 350,000 in terms of standard polystyrene by gel permeation chromatography analysis. The weight average molecular weight of the styrene-isoprene-styrene block copolymer can be in the above range, thereby not only enhancing the tensile strength of the resulting dip molded article, but also allowing the polymer solution of a styrene-isoprene-styrene block copolymer to have a proper viscosity in emulsification in an emulsification step described below while allowing the content rate of the styrene-isoprene-styrene block copolymer included in the solution to be relatively high, to thereby allow an emulsification step described below to be properly performed at a high productivity.

The molecular weight distribution (Mw/Mn) of the styrene-isoprene-styrene block copolymer is preferably 1.0 to 2.6, more preferably 1.0 to 2.4, further preferably 1.0 to 2.2. The molecular weight distribution of the styrene-isoprene-styrene block copolymer can be in the range to thereby suppress an increase in the viscosity of the polymer solution of a styrene-isoprene-styrene block copolymer even in the case of allowing the weight average molecular weight to be relatively high, consequently allowing the polymer solution of a styrene-isoprene-styrene block copolymer to have a proper viscosity in emulsification in an emulsification step described below, while allowing the content rate of the styrene-isoprene-styrene block copolymer included in the solution to be relatively high, to thereby perform an emulsification step described below at a high productivity. Herein, the molecular weight distribution (Mw/Mn) can be determined from the above-mentioned weight average molecular weight (Mw) and the number average molecular weight (Mn) in terms of standard polystyrene by gel permeation chromatography analysis.

Antioxidant Addition Step

The antioxidant addition step in the production method of the present invention is a step of adding an antioxidant to the polymer solution of synthetic polyisoprene and/or a styrene-isoprene-styrene block copolymer obtained in the above-mentioned polymerization step.

The amount of the antioxidant added in the antioxidant addition step in the production method of the present invention is 0.01 to 1.00 parts by weight, preferably 0.03 to 0.80 parts by weight, more preferably 0.05 to 0.60 parts by weight per 100 parts by weight of the synthetic polyisoprene and/or styrene-isoprene-styrene block copolymer included in the polymer solution. If the amount of the antioxidant added in the antioxidant addition step is too small, the tensile strength of the resulting dip molded article is reduced, and on the other hand, if the amount is too large, emulsification stability is inferior.

In the present invention, a predetermined amount of the antioxidant can be added to the polymer solution of synthetic polyisoprene and/or a styrene-isoprene-styrene block copolymer obtained in the above-mentioned polymerization step and the polymer solution can be emulsified in an emulsification step described below in the state where the antioxidant is added, thereby effectively preventing degradation due to heat history by emulsification and/or dip molding, to thereby properly enhance the tensile strength of the resulting dip molded article.

The antioxidant is not particularly limited, and a phenol-based antioxidant, a thiobisphenol-based antioxidant, a phosphorous acid ester-based antioxidant, a sulfur ester-based antioxidant, an amine-based antioxidant, a quinoline-based antioxidant, a hydroquinone-based antioxidant or the like can be used.

Examples of the phenol-based antioxidant include 2,6-di-t-butyl-4-methylphenol, 2,6-di-t-butylphenol, 2,6-di-t-butyl-4-methylphenol, butylhydroxyanisole, 2,6-di-t-butyl-p-cresol, 2,6-di-t-butyl-α-dimethylamino-p-cresol, octadecyl-3-(3,5-di-t-butyl-4-hydroxyphenyl)propionate, styrenated phenol, 2,2'-methylene-bis-(6-α-methyl-benzyl-p-cresol), 4,4'-methylenebis (2,6-di-t-butylphenol), 2,2'-methylene-bis-(4-methyl-6-t-butylphenol), alkylated bisphenol, and a butylated reaction product of p-cresol and dicyclopentadiene.

Examples of the thiobisphenol-based antioxidant include 2,2'-thiobis-(4-methyl-6-t-butyl-phenol), 4,4'-thiobis-(6-t-butyl-o-cresol) and 2,6-di-t-butyl-4-(4,6-bis(octylthio)-1,3,5-triazine-2-ylamino)phenol.

Examples of the phosphorous acid ester-based antioxidant include tris(nonylphenyl)phosphite, diphenylisodecyl phosphite and tetraphenyl dipropylene glycol-diphosphite.

Examples of the sulfur ester-based antioxidant include dilauryl thiodipropionate.

Examples of the amine-based antioxidant include phenyl-α-naphthylamine, phenol-β-naphthylamine, p-(p-toluene-sulfonylamide)-diphenylamine, 4,4'-(α,α-dimethylbenzyl) diphenylamine), N,N-diphenyl-p-phenylenediamine, N-isopropyl-N'-phenyl-p-phenylenediamine and a butylaldehyde-aniline condensation product.

Examples of the quinoline-based antioxidant include 6-ethoxy-2,2,4-trimethyl-1,2-dihydroquinone.

Examples of the hydroquinone-based antioxidant include 2,5-di-(t-amyl)hydroquinone.

Such antioxidants can be used singly or in combinations of two or more kinds thereof. Herein, when two or more antioxidants are used in combination, the total amount of such two or more antioxidants may be in the above range. Among them, a phenol-based antioxidant and a thiobisphenol-based antioxidant are preferable, and a phenol-based antioxidant and a thiobisphenol-based antioxidant are preferably used in combination from the viewpoint that the effect of addition can be more enhanced. Herein, when a phenol-based antioxidant and a thiobisphenol-based antioxidant are used in combination, the ratio of the phenol-based antioxidant and the thiobisphenol-based antioxidant used is preferably 60:40 to 95:5, more preferably 80:20 to 93:7 as the weight ratio "phenol-based antioxidant:thiobisphenol-based antioxidant".

Emulsification Step

The emulsification step in the production method of the present invention is a step of emulsifying the polymer solution to which the antioxidant is added in the antioxidant addition step, in water in the presence of a surfactant, to thereby obtain a polymer latex.

In the production method of the present invention, a predetermined amount of the antioxidant is added to the polymer solution obtained in the above-mentioned polymerization step and thereafter the polymer solution is emulsified in water in the presence of a surfactant without coagulation, thereby obtaining a polymer latex. That is, the polymer solution obtained is used without coagulation and is directly emulsified according to the present invention, and therefore, heat history applied to the synthetic polyisoprene and/or styrene-isoprene-styrene block copolymer can be reduced as compared with a case where coagulation is once performed, thereby allowing the resulting dip molded article to be excellent in tensile strength, according the production method of the present invention.

The surfactant for use in the emulsification step in the production method of the present invention is not particularly limited, and an anionic surfactant can be preferably used. Examples of the anionic surfactant include fatty acid salts such as sodium laurate, potassium myristate, sodium palmitate, potassium oleate, sodium linoleate and sodium rosinate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate and potassium cetylbenzenesulfonate; alkylsulfosuccinic acid salts such as sodium di(2-ethylhexyl)sulfosuccinate, potassium di(2-ethylhexyl)sulfosuccinate and dioctyl sodium sulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; and monoalkylphosphoric acid salts such as sodium lauryl phosphate and potassium lauryl phosphate.

Among these anionic surfactants, fatty acid salts, alkylbenzenesulfonic acid salts, alkylsulfosuccinic acid salts, alkylsulfuric acid ester salts and polyoxyethylene alkyl ether sulfuric acid ester salts are preferable, and fatty acid salts and alkylbenzenesulfonic acid salts are particularly preferable.

It is preferable to use at least one selected from the group consisting of alkylbenzenesulfonic acid salts, alkylsulfosuccinic acid salts, alkylsulfuric acid ester salts and polyoxyethylene alkyl ether sulfuric acid ester salts, and any fatty acid salt in combination, and it is particularly preferable to use any alkylbenzenesulfonic acid salt and any fatty acid salt in combination because the occurrence of an aggregate in production of a polymer latex is suppressed. Here, preferable fatty acid salts are sodium rosinate and potassium rosinate, and preferable alkylbenzenesulfonic acid salts are sodium dodecylbenzenesulfonate and potassium dodecylbenzenesulfonate. Such surfactants may be used singly or in combinations of two or more kinds thereof.

Furthermore, a surfactant other than the anionic surfactant may be used in combination in the production method of the present invention, and examples of such a surfactant other than the anionic surfactant include copolymerizable surfactants such as α,β-unsaturated carboxylic acid sulfoester, α,β-unsaturated carboxylic acid sulfate ester and sulfoalkyl aryl ether.

Any nonionic surfactant such as polyoxyethylene alkyl ether, polyoxyethylene alkylphenol ether, polyoxyethylene alkyl ester or polyoxyethylene sorbitan alkyl ester may be used as long as such a nonionic surfactant does not inhibit coagulation by a coagulating agent for use in dip molding.

The amount of the surfactant used is preferably 0.1 to 50 parts by weight, more preferably 0.5 to 40 parts by weight, further preferably 5 to 30 parts by weight per 100 parts by weight in total of the synthetic polyisoprene and the styrene-isoprene-styrene block copolymer included in the polymer solution. When two or more surfactants are used, the amount of the total thereof used is preferably in the above range. If the amount of the surfactant used is too small, an aggregate may occur in a large amount in emulsification, and an the contrary, if the amount is too large, foaming can occur to cause a pinhole to be generated in the resulting dip molded article.

The amount of water for use in the emulsification step in the production method of the present invention is preferably 10 to 1,000 parts by weight, more preferably 30 to 500 parts by weight, most preferably 50 to 100 parts by weight per 100 parts by weight of the polymer solution of synthetic polyisoprene and styrene-isoprene-styrene block copolymer (organic solvent solution). Examples of the types of water used include hard water, soft water, ion-exchange water, distilled water and zeolite water, and soft water, ion-exchange water and distilled water are preferable.

In the emulsification step in the production method of the present invention, emulsification is performed so that the ratio D75/D25 (μm/μm) of the volume particle size D75 at a cumulative frequency of 75% to the volume particle size D25 at a cumulative frequency of 25% of a particle of the synthetic polyisoprene and/or styrene-isoprene-styrene block copolymer contained in the polymer latex obtained by emulsification is 1.90 or more and 2.30 or less, preferably 1.92 or more and 2.28 or less, further preferably 1.94 or more and 2.26 or less. If the D75/D25 is less than 1.90, film formability in dip molding is deteriorated, and if the D75/D25 is tried to be less than 1.90, the time taken for the emulsification step is extremely longer, thereby causing productivity to be extremely inferior. On the other hand, if the D75/D25 is more than 2.30, the polymer latex is inferior in emulsification stability and also is reduced in the tensile strength of the resulting dip molded article. Herein, the volume particle size D25 at a cumulative frequency of 25% and the volume particle size D75 at a cumulative frequency of 75% mean the particle size at a cumulative frequency of 25% on a volume basis and the particle size at a cumulative frequency of 75% on a volume basis, respectively, and can be defined as the particle size at a cumulative volume of 25% and the particle size at a cumulative volume of 75%, respectively, obtained by, for example, measuring the particle size distribution according to a light scattering diffraction method and conducting calculation from the smaller size in the particle size distribution measured.

Herein, examples of the method for allowing the D75/D25 to be in the above range in the production method of the present invention include, but are not particularly limited, a method including controlling the configuration of an emulsifying apparatus for use in the emulsification step, the number of emulsification PASSes described below, the emulsification temperature, the pressure in emulsification, and the like depending on the weight average molecular weight (Mw) and the molecular weight distribution (Mw/Mn) of the synthetic polyisoprene and styrene-isoprene-styrene block copolymer.

For example, as the emulsifying apparatus, a batch type emulsifying machine such as trade name "Homogenizer" (manufactured by IKA), trade name "Polytron" (manufactured by Kinematica) or trade name "TK Auto Homomixer" (manufactured by Primix Corporation); a continuous emulsifying machine such as trade name "TK-pipeline homomixer" (manufactured by Primix Corporation), trade name "Colloid Mill" (manufactured by Shinko Pantech Co., Ltd.), trade name "Slusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) or trade name "Fine flow mill" (manufactured by Pacific Machinery & Engineering Co., Ltd.); a high-pressure emulsifying machine such as trade name "Macrofluidizer" (manufactured by Mizuho Industrial Co., Ltd.), trade name "Nanomizer" (manufactured by Nanomizer Inc.) or trade name "APV Gaulin" (manufactured by APV Gaulin Inc.); a membrane emulsifying machine such as trade name "Membrane emulsifying machine" (manufactured by Reica Co., Ltd.); a vibration type emulsifying machine such as trade name "Vibromixer" (manufactured by Reica Co., Ltd.); or an ultrasonic emulsifying machine such as trade name "Ultrasonic homogenizer" (manufactured by Branson Ultrasonics, Emerson Japan, Ltd.); can be used.

The number of emulsification PASSes (the number of passings through the emulsifying apparatus in emulsification) is preferably 1 to 20 PASS, more preferably 5 to 15 PASS, and the emulsification temperature is preferably 10 to 70° C., more preferably 30 to 65° C. The pressure in emulsification (gauge pressure) is preferably 0.01 to 0.50 MPa, more preferably 0.05 to 0.30 MPa.

Herein, the volume particle size D25 at a cumulative frequency of 25% and the volume particle size D75 at a cumulative frequency of 75% of the synthetic polyisoprene and/or styrene-isoprene-styrene block copolymer contained in the polymer latex obtained by emulsification may be set so that the D75/D25 thereof is in the above range, and the volume particle size D25 at a cumulative frequency of 25% is preferably 0.50 to 1.50 μm, more preferably 0.70 to 1.45 μm, further preferably 0.80 to 1.40 μm and the volume particle size D75 at a cumulative frequency of 75% is preferably 2.00 to 3.00 μm, more preferably 2.10 to 2.90 μm, further preferably 2.20 to 2.80 μm. Furthermore, the average particle size (volume particle size D50 at a cumulative frequency of 50%) of the synthetic polyisoprene and/or styrene-isoprene-styrene block copolymer is preferably 1.40 to 2.20 μm, more preferably 1.45 to 2.10 μm.

It is desirable in the production method of the present invention to remove the organic solvent from the emulsion obtained in the emulsification step in the production method of the present invention. The method for removing the organic solvent from the emulsion is preferably a method enables the content of the organic solvent (preferably aliphatic hydrocarbon solvent) in the resulting polymer latex to be 500 ppm by weight or less, and, for example, a method of distillation under reduced pressure, atmospheric distillation, steam distillation, centrifugation or the like can be adopted.

To the polymer latex thus obtained may be compounded additive(s) commonly compounded in the latex field, such as a pH adjuster, a defoamer, a preservative, a chelating agent, an oxygen scavenger, a dispersing agent and an antioxidant.

Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxide or ammonia is preferable.

A concentration operation may be, if necessary, conducted according to a method such as distillation under reduced pressure, atmospheric distillation, centrifugation, or membrane concentration in order to increase the solid content concentration of the polymer latex, and centrifugation is preferably performed from the viewpoint that the remaining amount of the surfactant in the polymer latex can be adjusted.

When the polymer latex is subjected to a centrifuge machine, a pH adjuster is preferably added in advance to adjust the pH of the polymer latex to 7 or more, more preferably 9 or more for an enhancement in mechanical stability of the polymer latex. As the pH adjuster, alkali metal hydroxide such as sodium hydroxide and potassium hydroxide, or ammonia is preferable.

The centrifugation is preferably performed in conditions of, for example, preferably a centrifugal force of 4,000 to 5,000 G by use of a continuous centrifuge machine, preferably a solid content concentration of the polymer latex before the centrifugation, of 2 to 15% by weight, preferably a flow rate for feeding into the centrifuge machine, of 500 to 2000 Kg/hr, and preferably a back pressure (gauge pressure) of the centrifuge machine, of 0.03 to 1.6 MPa.

The solid content concentration of the polymer latex produced by the production method of the present invention is preferably 30 to 70% by weight, more preferably 40 to 70% by weight. The solid content concentration can be in the above range, thereby not only suppressing separation of a polymer particle in storage of the polymer latex, but also suppressing the occurrence of a coarse aggregate due to polymer particle aggregation.

The total content of the surfactant in the polymer latex produced by the production method of the present invention is preferably 5 parts by weight or less, more preferably 3 parts by weight or less, further preferably 0.1 to 3 parts by weight per 100 parts by weight in total of the synthetic polyisoprene and the styrene-isoprene-styrene block copolymer. When the total content of the surfactant is in the above range, a dip molded article where the occurrence of foaming is suppressed, tensile strength is excellent and no pinhole occurs is easily obtained.

The viscosity of the polymer latex produced by the production method of the present invention is usually 1 to 1000 mPa·s, preferably 30 to 500 mPa·s, more preferably 50 to 400 mPa·s, further preferably 100 to 300 mPa·s. The viscosity of the polymer latex can be measured, for example, by use of a B-type viscometer at ordinary temperature (25° C.). The viscosity of the polymer latex can be in the above range, thereby allowing dip molding to be more properly-performed.

Latex Composition

The latex composition of the present invention is obtained by adding a crosslinking agent to the polymer latex containing synthetic polyisoprene and/or the styrene-isoprene-styrene block copolymer obtained by the production method of the present invention.

Examples of the crosslinking agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, caprolactam-disulfide (N,N'-dithio-bis(hexahydro-2H-azepinone-2)), phosphorus-containing polysulfide, polymeric polysulfide and 2-(4'-morpholinodithio)benzothiazole. Among them, sulfur can be preferably used. Such crosslinking agents can be used singly or in combinations of two or mere kinds thereof.

The content of the crosslinking agent is not particularly limited, and is preferably 0.1 to 10 parts by weight, more preferably 0.2 to 3 parts by weight per 100 parts by weight in total of the synthetic polyisoprene and the styrene-isoprene-styrene block copolymer. The content of the crosslinking agent can be in the above range, thereby more enhancing the tensile strength of the resulting dip molded article.

The latex composition of the present invention preferably further contains a crosslinking accelerator.

A crosslinking accelerator usually used in dip molding can be used as the crosslinking accelerator, and examples include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbarylthio)benzothiazole, 2-(2,6-dimethyl-4-morpholinothio)benzothiazole, 2-(4'-morpholino-dithio) benzothiazole, 4-morpholinyl-2-benzothiazyl-disulfide and 1,3-bis(2-benzothiazyl-mercaptomethyl)urea, and zinc diethyldithiocarbamate, zinc 2-dibutyldithiocarbamate and zinc 2-mercaptobenzothiazole are preferable. Such crosslinking accelerators can be used singly or in combinations of two or more kinds thereof.

The content of the crosslinking accelerator is preferably 0.05 to 5 parts by weight, more preferably 0.1 to 2 parts by weight per 100 parts by weight in total of the synthetic polyisoprene and the styrene-isoprene-styrene block copolymer. The content of the crosslinking accelerator can be in the above range, thereby more enhancing the tensile strength of the resulting dip molded article.

The latex composition of the present invention preferably further contains zinc oxide.

The content of the zinc oxide is not particularly limited, and is preferably 0.1 to 5 parts by weight, more preferably 0.2 to 2 parts by weight per 100 parts by weight in total of the synthetic polyisoprene and the styrene-isoprene-styrene block copolymer. The content of the zinc oxide can be in the above range, thereby more enhancing the tensile strength of the resulting dip molded article, with emulsification stability being favorable.

To the latex composition of the present invention can be, if necessary, compounded a compounding agent, for example, an antioxidant, a dispersing agent; a reinforcement agent such as carbon black, silica or talc; a filler such as calcium carbonate or clay; an ultraviolet absorber; or a plasticizer.

Examples of the method for preparing the latex composition of the present invention include, but are not particularly limited, a method including mixing the crosslinking agent and various compounding agents, if necessary compounded, with the polymer latex containing synthetic polyisoprene and/or a styrene-isoprene-styrene block copolymer by use of a dispersing machine such as a ball mill, a kneader or a diaper, and a method including preparing an aqueous dispersion liquid of compounding components other than the polymer latex containing synthetic polyisoprene and/or a styrene-isoprene-styrene block copolymer, by use of the above dispersing machine, and thereafter mixing the aqueous dispersion liquid with the polymer latex containing synthetic polyisoprene and/or a styrene-isoprene-styrene block copolymer.

The pH of the latex composition of the present invention is preferably 7 or more, more preferably in the range of 7 to 13, further preferably in the range of 8 to 12. The solid content concentration of the latex composition is preferably in the range of 15 to 65% by weight.

The latex composition of the present invention is preferably subjected to aging (pre-crosslinking) before dip molding from the viewpoint that mechanical properties of the resulting dip molded article are more enhanced. The pre-crosslinking time is not particularly limited and is preferably 1 to 14 days, more preferably 1 to 7 days, depending on the pre-crosslinking temperature. Herein, the pre-crosslinking temperature is preferably 20 to 40° C.

The resultant is preferably stored at a temperature of 10 to 30° C. for the period from completion of the pre-crosslinking to dip molding. If the resultant is stored at a high temperature, the tensile strength of the resulting dip molded article may be reduced.

Dip Molded Article

The dip molded article of the present invention is obtained by dip molding the latex composition of the present invention. Dip molding means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent preferably include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip molded article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold usually by heating is dried. The drying conditions may be appropriately selected.

Next, the deposit formed on the mold by heating is crosslinked.

While the heating conditions in crosslinking are not particularly limited, the heating temperature is preferably 50 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

In order to remove water-soluble impurities (for example, excessive surfactant and/or coagulating agent) before or after heating the mold on which the latex composition is deposited, the mold is preferably washed with water or warm water. The warm water used is preferably at 40° C. to 80° C., more preferably at 50° C. to 70° C.

The dip molded article after crosslinking is detached from the mold. Specific examples of the detaching method include a method for releasing the article from the mold by hand and a method for releasing the article by water pressure or compressed air pressure. When the dip molded article during crosslinking has a sufficient strength for detaching, the dip molded article may be detached during crosslinking and continuously subsequently crosslinked.

The dip molded article of the present invention is obtained using the polymer latex of synthetic polyisoprene and/or a styrene-isoprene-styrene block copolymer, obtained by the production method of the present invention, and is thus excellent in tensile strength and can be particularly suitably used as a glove. When the dip molded article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the dip molded article to thereby enhance slipping during detachment.

The dip molded article of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

EXAMPLES

Hereinafter, the present invention will be more specifically described with reference to Examples and Comparative Examples, but the present invention is not intended to be limited to such Examples. Hereinafter, unless particularly noted, "part(s)" is on a weight basis. The test or evaluation methods of physical properties and characteristics are as follows.

Weight Average Molecular Weight (Mw) and Molecular Weight Distribution (Mw/Mn)

Dilution With tetrahydrofuran was made so that the solid content concentration of the synthetic polyisoprene or styrene-isoprene-styrene block copolymer included in the polymer solution was 0.1% by weight, and the solution was subjected to gel permeation chromatography analysis to calculate the weight average molecular weight (Mw) and the molecular weight distribution (Mw/Mn) in terms of standard polystyrene.

Volume Particle Size D25 at Cumulative Frequency of 25% and Volume Particle Size D75 at Cumulative Frequency of 75% of Polymer Latex The particle size distribution of the polymer latex was measured using a light scattering diffraction particle measurement apparatus (manufactured by Beckman Coulter, Inc.: LS-230), the volume particle size D25 at a cumulative frequency of 25% and the volume particle size D75 at a cumulative frequency of 75% were determined from the measurement results, and the D25 and D75 determined were used to calculate the ratio D75/D25.

Emulsification Stability of Polymer Latex

The polymer latex was placed into a 100-ml-sized glass container and left to stand in a condition of 23° C. for 24 hours, and the state of the polymer latex after such standing was visually observed to thereby evaluate the emulsification stability. Herein, the emulsification stability was evaluated according to the following criteria.

Good: neither any aggregate nor any separation could be confirmed after standing for 24 hours.

Fair: an aggregate was slightly confirmed after standing for 24 hours.

Poor: an aggregate was confirmed in a large amount or separation was made to cause film formation after standing for 24 hours.

Tensile Strength of Dip Molded Article

The tensile strength of the dip molded article was measured based on ASTM D412. Specifically, the dip molded article was subjected to punching by a dumbbell (Die-C) to produce a test piece for measurement, and the resulting test piece was pulled at a tensile rate of 500 mm/min by a Tensilon universal tester ("RTC-1225A" manufactured by ORIENTEC Co., LTD) to measure the tensile strength (unit: MPa) immediately before breakage.

Example 1

(Polymerization Step and Antioxidant Addition Step)

An autoclave equipped with a stirrer, dried and purged with nitrogen, was charged with 1150 parts of n-hexane and 100 parts of isoprene. The temperature in the autoclave was set to 60° C., and 0.1105 parts of a hexane solution containing 15% by weight of n-butyllithium, as a catalyst solution, was added with stirring to allow a reaction to run for 1 hour. The polymerization reaction rate was 99%. To the resulting reaction liquid was added 0.0831 parts of methanol as a polymerization terminator, to terminate the reaction, thereby obtaining polymer solution (A-1) of synthetic polyisoprene. Furthermore, 0.36 parts of 2,6-di-tert-butyl-p-cresol (produced by Chuo-chem.) and 0.05 parts of 2,6-di-tert-butyl-4-(4,6-bis(octylthio)-1,3,5-triazine-2-ylamino)phenol (produced by Ciba Specialty Chemicals, trade name "IRGANOX565") as antioxidants per 100 parts of the synthetic polyisoprene included in the polymer solution were added to polymer solution (A-1) obtained, and dissolved under stirring at room temperature, thereby obtaining polymer solution (A-1) of synthetic polyisoprene to which the antioxidants were added.

The synthetic polyisoprene included in polymer solution (A-1) obtained had a weight average molecular weight (Mw) of 510,000 and a molecular weight distribution (Mw/Mn) of 2.0.

(Emulsification Step)

Ten parts of sodium rosinate and water were mixed to prepare an aqueous anionic surfactant solution having a sodium rosinate concentration of 0.5% by weight at a temperature of 60° C. Polymer solution (A-1) of synthetic polyisoprene obtained above and the aqueous anionic surfactant solution were then mixed by use of "Multi Line Mixer MS26-MMR-5.5L" (trade rage) (manufactured by Satake Chemical Equipment Mfg., Ltd.) so that the weight ratio was 1:1.5, and subsequently mixed and emulsified at 4100 rpm by use of "Milder MDN310" (trade name) (manufactured by Pacific Machinery & Engineering Co., Ltd.), thereby obtaining an emulsified liquid. Herein, the total food flow rate of polymer solution (A-1) of synthetic polyisoprene and the aqueous anionic surfactant solution was 2,000 kg/hr, the temperature was 60° C., and the back pressure (gauge pressure) was 0.05 MPa.

Next, emulsified liquid obtained above was warmed to 80° C. under a reduced pressure of −0.01 to −0.09 MPa (gauge pressure), to distill off n-hexane. Here, "SM5515" (trade name) (produced by Dow Corning Toray Co., Ltd.) was used as a defoamer, and continuously added with spraying so that the amount thereof was 300 ppm by weight relative to the synthetic polyisoprene in the emulsified liquid. When n-hexane was here distilled off, the amount of emulsified liquid was adjusted so as to be 70% by volume or less based on the tank volume, and a three-step inclined paddle blade was used as a stirring blade to slowly-perform stirring at 60 rpm.

After distillation off of n-hexane was completed, emulsified liquid from which n-hexane was distilled off was used to perform centrifugation at 4,000 to 5,000 G by use of a continuous centrifuge machine (trade name "SRG510", manufactured by ALFA LAVAL), thereby obtaining latex (B-1) of synthetic polyisoprene, having a solid content concentration of 56% by weight, as a light liquid. Herein, the conditions for centrifugation were as follows: the solid content concentration of the emulsified liquid before centrifugation was 10% by weight, the flow rate in continuous centrifugation was 1300 kg/hr and the back pressure (gauge pressure) of the centrifuge machine was 1.5 MPa.

Latex (B-1) of synthetic polyisoprene obtained had a solid content concentration of 56% by weight, a ratio D75/D25 of the volume particle size D75 at a cumulative frequency of 75% to the volume particle size D25 at a cumulative frequency of 25%, of 2.12, a pH of 10, a viscosity of 210 mPa·s, as measured by a B-type viscometer, and a total anionic surfactant content per 100 parts of synthetic polyisoprene, of 2.0 parts. In addition, no aggregate was observed in latex (B-1) of synthetic polyisoprene. Apart of latex (B-1) of synthetic polyisoprene obtained was then used and evaluation of the emulsification stability was performed according to the above method. The results are shown in Table 1.

(Preparation of Latex Composition)

While latex (B-1) of synthetic polyisoprene obtained above was stilled, dodecylbenzenesulfonic acid soda having a concentration of 10% by weight was added so that the amount thereof was 1 part in terms of the solid content per 100 parts of the synthetic polyisoprene in the latex. While the resulting mixture was then stirred, 1.5 parts of zinc oxide, 1.5 parts of sulfur, 3 parts of an antioxidant (trade name: Wingstay L, manufactured by Goodyear Tire and Rubber Company), 0.3 parts of zinc diethyldithiocarbamate, 0.5 parts of zinc dibutyldithiocarbamiate and 0.7 parts of a mercaptobenzothiazole zinc salt, in terms of the solid content per 100 parts of the synthetic polyisoprene in the mixture, were added in the state of a water dispersion liquid and thereafter an aqueous potassium hydroxide solution was added thereto to adjust the pH to 10.5, thereby obtaining a latex composition.

Next, the resulting latex composition was aged in a constant temperature water bath adjusted at 30° C., for 48 hours.

(Production of Dip Molded Article)

A commercially available ceramic hand mold (manufactured by Shinko Ceramics Co., Ltd.) was washed, pre-heated in an oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and taken out. Next, the hand mold covered with the coagulating agent was dried in an oven at 70° C. for 30 minutes or more.

Next, the hand mold covered with the coagulating agent was taken out from the oven, and dipped in the latex composition after aging, obtained above, for 10 seconds. Thereafter, the hand mold was air dried at room temperature for 10 minutes and then dipped in warm water at 60° C. for 5 minutes, and thereafter the hand mold covered with film-shaped synthetic polyisoprene was placed in an oven at 130° C. and heated for 30 minutes to thereby perform crosslinking. Next, the hand mold covered with a film crosslinked was cooled to room temperature, thereafter talc was spread thereon, and then peeling off from the hand mold was made to thereby obtain a dip molded article (glove). The tensile strength of the resulting dip molded article (glove) was then measured according to the method. The results are shown in Table 1.

Example 2

The same manner as in Example 1 was performed except that the amount of the hexane solution containing 15% by weight of n-butyllithium, as a catalyst solution, and the amount of methanol as a polymerization terminator, in the polymerization step, were changed to 0.0955 parts and 0.0716 parts, respectively, and also the amount of 2,6-di-tert-butyl-p-cresol added and the amount of 2,6-di-tert-butyl-4-(4,6-bis(octylthio)-1,3,5-triazine-2-ylamino)phenol added as antioxidants in the antioxidant addition step were changed to 0.28 parts and 0.04 parts, respectively, thereby obtaining polymer solution (A-2) of synthetic polyisoprene to which the antioxidants were added.

The synthetic polyisoprene included in polymer solution (A-2) obtained had a weight average molecular weight (Mw) of 590,000 and a molecular weight distribution (Mw/Mn) of 1.6.

Next, the same manner as in Example 1 was performed except that polymer solution (A-2) of synthetic polyisoprene obtained was used and also the emulsification temperature in the emulsification step was changed to 50° C., thereby obtaining latex (B-2) of synthetic polyisoprene. Latex (B-2) of synthetic polyisoprene obtained had a solid content concentration of 56% by Weight, a ratio D75/D25 of the volume particle size D75 at a cumulative frequency of 75% to the volume particle size D25 at a cumulative frequency of 25%, of 1.96, a pH of 10.2, a viscosity of 220 mPa·s, as measured by a B-type viscometer, and a total anionic surfactant content per 100 parts of synthetic polyisoprene, of 1.9 parts. In addition, no aggregate was observed in latex (B-2) of synthetic polyisoprene. A part of latex (B-2) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-2) of synthetic polyisoprene obtained above was used. The results are shown in Table 1.

Example 3

The same manner as in Example 1 was performed except that the amount of the hexane solution containing 15% by weight of n-butyllithium, as a catalyst solution, and the amount of methanol as a polymerization terminator, in the polymerization step, were changed to 0.0687 parts and 0.0515 parts, respectively, and also the amount of 2,6-di-tert-butyl-p-cresol added and the amount of 2,6-di-tert-butyl-4-(4,6-bis(octylthio)-1,3,5-triazine-2-ylamino) enol added as antioxidants in the antioxidant addition step were changed to 0.17 parts and 0.02 parts, respectively, thereby obtaining polymer solution (A-3) of synthetic polyisoprene to which the antioxidants were added.

The synthetic polyisoprene included in polymer solution (A-3) obtained had a weight average molecular weight (Mw) of 820,000 and a molecular weight distribution (Mw/Mn) of 1.8.

Next, the same manner as in Example 1 was performed except that polymer solution (A-3) of synthetic polyisoprene obtained was used and also the pressure in emulsification (gauge pressure) in the emulsification step was changed to 0.15 MPa, thereby obtaining latex (B-3) of synthetic polyisoprene. Latex (B-3) of synthetic polyisoprene obtained had a solid content concentration of 56% by weight, a ratio 75/D25 of the volume particle size D75 at a cumulative frequency of 75% to the volume particle size D25 at a cumulative frequency of 25%, of 2.03, a pH of 9.9, a viscosity of 260 mPa·s, as measured by a B-type viscometer, and a total anionic surfactant content per 100 parts of synthetic polyisoprene, of 2.1 parts. In addition, no aggregate was observed in latex (B-3) of synthetic polyisoprene. A part of latex (B-3) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-3) of synthetic polyisoprene obtained above was used. The results are shown in Table 1.

Example 4

An autoclave equipped with a stirrer, dried and purged with nitrogen, was charged with 1150 parts of n-hexane, 15 parts of styrene and 0.0017 parts of N,N,N',N'-tetramethylethane-1,2-diamine. The temperature in the autoclave was set to 60° C., and 0.2036 parts of a hexane solution containing 15% by weight of n-butyllithium, as a catalyst solution, was added with stirring to allow a reaction to run for 20 minutes. Next, 85 parts of isoprene was continuously added into the autoclave for 1 hour. After such continuous addition, the reaction was allowed to run for 15 minutes. Next, 0.0308 parts of dimethyldichlorosilane was added to allow the reaction to run for 30 minutes. The polymerization reaction rate was 99%. To the resulting reaction liquid was added 0.0153 parts of methanol as a polymerization terminator, to terminate the reaction, thereby obtaining polymer solution (A-4) of styrene-isoprene-styrene block copolymer. Furthermore, 0.07 parts of 2,6-di-tert-butyl-p-cresol (produced by Chuo-chem.) and 0.01 parts of 2,6-di-tert-butyl-4-(4,6-bis (octylthio)-1,3,5-triazine-2-ylamino)phenol (produced by Ciba Specialty Chemicals, trade name "IRGANOX565") as antioxidants per 100 parts of the styrene-isoprene-styrene block copolymer included in the polymer solution were added to polymer solution (A-1) obtained, and dissolved under stirring at room temperature, thereby obtaining polymer solution (A-4) of a styrene-isoprene-styrene block copolymer to which the antioxidants were added.

The styrene-isoprene-styrene block copolymer included in polymer solution (A-4) obtained had a weight average molecular weight (Mw) of 250,000 and a molecular weight distribution (Mw/Mn) of 1.1.

Next, the same manner as in Example 1 was performed except that polymer solution (A-4) of a styrene-isoprene-styrene block copolymer obtained was used, thereby obtaining latex (B-4) of a styrene-isoprene-styrene block copolymer. Latex (B-4) of a styrene-isoprene-styrene block copolymer obtained had a solid content concentration of 56% by weight, a ratio D75/D25 of the volume particle size D75 at a cumulative frequency of 75% to the volume particle size D25 at a cumulative frequency of 25%, of 2.21, a pH of 9.9, a viscosity of 140 mPa·s, as measured by a B-type viscometer, and a total anionic surfactant content per 100 parts of a styrene-isoprene-styrene block copolymer, of 1.9 parts. In addition, no aggregate was observed in latex (B-4) of a styrene-isoprene-styrene block copolymer. A part of latex (B-4) of a styrene-isoprene-styrene block copolymer obtained was then used and evaluation of the emulsification stability was performed according to the above method. The results are shown in Table 1.

In addition, a latex composition and a dip molded article were obtained and evaluated in the same manner as in Example 1 except that latex (B-4) of a styrene-isoprene-styrene block copolymer obtained above was used. The results are shown in Table 1.

Comparative Example 1

Polymer solution (A-3) of synthetic polyisoprene to which the antioxidants were added, obtained in Example 3, was subjected to coagulation with steam, and the resulting coagulated product was dried in a condition of 150° C. to 200° C., thereby obtaining solid synthetic polyisoprene (C-5).

Synthetic polyisoprene (C-5) obtained was then mixed with n-hexane, and dissolved with the temperature being raised to 60° C. under stirring, thereby preparing n-hexane solution (D-5) of synthetic polyisoprene. Herein, the content of antioxidants included in n-hexane solution (D-5) of synthetic polyisoprene (namely, the total content of 2,6-di-tert-butyl-p-cresol and 2,6-di-tert-butyl-4-(4,6-bis(octylthio)-1,3,5-triazine-2-ylamino)phenol) was measured using high-performance liquid chromatograph (manufactured by Agilent Technologies: HP1100), and was found to be 0.02 parts per 100 parts of the synthetic polyisoprene. The synthetic polyisoprene included in n-hexane solution (D-5) had a weight average molecular weight (Mw) of 700,000 and a molecular weight distribution (Mw/Mn) of 3.2.

Next, the emulsifying operation was performed in the same manner as in Example 1 except that n-hexane solution (D-5) of synthetic polyisoprene obtained was used, thereby obtaining latex (B-5) of synthetic polyisoprene. Latex (B-5) of synthetic polyisoprene obtained had a solid content concentration of 56% by weight, a ratio D75/D25 of the volume particle size D75 at a cumulative frequency of 75% to the volume particle size D25 at a cumulative frequency of 25%, of 2.35, a pH of 10, a viscosity of 280 mPa·s, as measured by a B-type viscometer, and a total anionic surfactant content per 100 parts of synthetic polyisoprene, of 2.2 parts. A part of latex (B-5) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-5) of synthetic polyisoprene obtained above was used. The results are shown in Table 1.

Comparative Example 2

Polymer solution (A-1) of synthetic polyisoprene to which the antioxidants were added, obtained in Example 1, was subjected to coagulation with steam, and the resulting coagulated product was dried in a condition of 150° C. to 200° C., thereby obtaining solid synthetic polyisoprene (C-6).

Synthetic polyisoprene (C-6) obtained was then mixed with n-hexane, and dissolved with the temperature being raised to 60° C. under stirring, thereby preparing n-hexane solution (D-6) of synthetic polyisoprene. Herein, the content of antioxidants included in n-hexane solution (D-6) of synthetic polyisoprene (namely, the total content of 2,6-di-tert-butyl-p-cresol and 2,6-di-tert-butyl-4-(4,6-bis(octylthio)-1,3,5-triazine-2-ylamino)phenol) was measured using high-performance liquid chromatograph (manufactured by Agilent Technologies: HP1100), and was found to be 0.02 parts per 100 parts of the synthetic polyisoprene. The synthetic polyisoprene included in n-hexane solution (D-6) had a weight average molecular weight (Mw) of 430,000 and a molecular weight distribution (Mw/Mn) of 3.5.

Next, the emulsifying operation was performed in the same manner as in Example 1 except that n-hexane solution (D-6) of synthetic polyisoprene obtained was used and also 0.32 parts of 2,6-di-tert-butyl-p-cresol and 0.04 parts of 2,6-di-tert-butyl-4-(4,6-bis(octylthio)-1,3,5-triazine-2-ylamino)phenol were further added to the emulsion obtained, thereby obtaining latex (B-6) of synthetic polyisoprene. Latex (B-6) of synthetic polyisoprene obtained had a solid content concentration of 56% by weight, a ratio D75/D25 of the volume particle size D75 at a cumulative frequency of 75% to the volume particle size D25 at a cumulative frequency of 25%, of 2.40, a pH of 10.2, a viscosity of 200 mPa·s, as measured by a B-type viscometer, and a total anionic surfactant content per 100 parts of synthetic polyisoprene, of 2.0 parts. A part of latex (B-6) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-6) of synthetic polyisoprene obtained above was used. The results are shown in Table 1.

Comparative Example 3

The same manner as in Example 1 was performed except that the amount of 2,6-di-tert-butyl-p-cresol added and the amount of 2,6-di-tert-butyl-4-(4,6-bis(octylthio)-1,3,5-triazine-2-ylamino) phenol added as antioxidants were changed to 5.10 parts and 0.70 parts, respectively, thereby obtaining polymer solution (A-7) of synthetic polyisoprene to which the antioxidants were added, and polymer solution (A-7) of synthetic polyisoprene obtained was subjected to coagulation with steam and the resulting coagulated product was dried in a condition of 150° C. to 200° C., thereby obtaining solid synthetic polyisoprene (C-7).

Synthetic polyisoprene (C-7) obtained was then mixed with n-hexane, and dissolved with the temperature being raised to 60° C. under stirring, thereby preparing n-hexane solution (D-7) of synthetic polyisoprene. Herein, the content of antioxidants included in n-hexane solution (D-7) of synthetic polyisoprene (namely, the total content of 2,6-di-tert-butyl-p-cresol and 2,6-di-tert-butyl-4-(4,5-bis(octylthio)-1,3,5-triazine-2-ylamino)phenol) was measured using high-performance liquid chromatograph (manufactured by Agilent Technologies: HP1100), and was found to be 0.29 parts per 100 parts of the synthetic polyisoprene. The synthetic polyisoprene included in n-hexane solution (D-7) had a weight average molecular weight (Mw) of 450,000 and a molecular weight distribution (Mw/Mn) of 3.6.

Next, the emulsifying operation was performed in the same manner as in Example 1 except that n-hexane solution (D-7) of synthetic polyisoprene obtained was used, thereby obtaining latex (B-7) of synthetic polyisoprene. Latex (B-7) of synthetic polyisoprene obtained had a solid content concentration of 56% by weight, a ratio D75/D25 of the volume particle size D75 at a cumulative frequency of 75% to the volume particle size D25 at a cumulative frequency of 25%, of 2.43, a pH of 10.1, a viscosity of 210 mPa·s, as measured by a B-type viscometer, and a total anionic surfactant content per 100 parts of synthetic polyisoprene, of 2.0 parts. Apart of latex (B-7) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-7) of synthetic polyisoprene obtained above was used. The results are shown in Table 1.

Comparative Example 4

The same manner as in Example 1 was performed except that the amount of the hexane solution containing 15% by weight of n-butyllithium, as a catalyst solution, and the amount of methanol as a polymerization terminator, in the polymerization step, were changed to 0.0705 parts and 0.0528 parts, respectively, and also the amount of 2,6-di-tert-butyl-p-cresol added and the amount of 2,6-di-tert-butyl-4-(4,6-bis(octylthio)-1,3,5-triazine-2-ylamino)phenol added as antioxidants in the antioxidant addition step were changed to 0.004 parts and 0.001 parts, respectively, thereby obtaining polymer solution (A-8) of synthetic polyisoprene to which the antioxidants were added.

The synthetic polyisoprene included in polymer solution (A-8) obtained had a weight average molecular weight (Mw) of 800,000 and a molecular weight distribution (Mw/Mn) of 1.9.

Next, the emulsifying operation was performed in the same manner as in Example 1 except that polymer solution (A-8) of synthetic polyisoprene obtained was used, thereby obtaining latex (B-8) of synthetic polyisoprene. Latex (B-8) of synthetic polyisoprene obtained had a solid content concentration of 56% by weight, a ratio D75/D25 of the volume particle size D75 at a emulative frequency of 75% to the volume particle size D25 at a cumulative frequency of 25%, of 2.01, a pH of 10.1, a viscosity of 310 mPa·s, as measured by a B-type viscometer, and a total anionic surfactant content per 100 parts of synthetic polyisoprene, of 1.9 parts. A part of latex (B-8) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-8) of synthetic polyisoprene obtained above was used. The results are shown in Table 1.

Comparative Example 5

The same manner as in Example 1 was performed except that the amount of the hexane solution containing 15% by weight of n-butyllithium, as a catalyst solution, and the amount of methanol as a polymerization terminator, in the polymerization step, were changed to 0.0895 parts and 0.0671 parts, respectively, and also the amount of 2,6-di-tert-butyl-p-cresol added and the amount of 2,6-di-tert-butyl-4-(4,6-bis(octylthio)-1,3,5-triazine-2-ylamino)phenol added as antioxidants in the antioxidant addition step were changed to 0.35 parts and 0.05 parts, respectively, thereby obtaining polymer solution (A-9) of synthetic polyisoprene to which the antioxidants were added.

The synthetic polyisoprene included in polymer solution (A-9) obtained had a weight average molecular weight (Mw) of 630,000 and a molecular weight distribution (Mw/Mn) of 2.9.

Next, the emulsifying operation was performed in the same manner as in Example 1 except that the polymer solution (A-9) of synthetic polyisoprene obtained was used, thereby obtaining latex (B-9) of synthetic polyisoprene. Latex (B-9) of synthetic polyisoprene obtained had a solid content concentration of 56% by weight, a ratio D75/D25 of the volume particle size D75 at a cumulative frequency of 75% to the volume particle size D25 at a cumulative frequency of 25%, of 2.38, a pH of 10, a viscosity of 280 mPa·s, as measured by a B-type viscometer, and a total anionic surfactant content per 100 parts of synthetic polyisoprene, of 2.1 parts. A part of latex (B-9) of synthetic polyisoprene obtained was then used and evaluation of the emulsification stability was performed according to the above method. The results are shown in Table 1.

In addition, a latex composition and a dip molded article were obtained and evaluated in the same manner as in Example 1 except that latex (B-9) of synthetic polyisoprene obtained above was used. The results are shown in Table 1.

TABLE 1

| | Production method*[1] | Type of polymer | Polymer solution after polymerization | | Polymer solution after coagulation and re-dissolution | | Polymer latex | | Dip molded article Tensile strength (MPa) |
|---|---|---|---|---|---|---|---|---|---|
| | | | MW of polymer | Content of antioxidant per 100 parts of polymer (parts) | MW of polymer | Content of antioxidant per 100 parts of polymer (parts) | D75/D25 | Emulsification stability | |
| Example 1 | Direct emulsification | Synthetic polyisoprene | 510,000 | 0.41 | — | — | 2.12 | Good | 24 |
| Example 2 | Direct emulsification | Synthetic polyisoprene | 590,000 | 0.32 | — | — | 1.96 | Good | 24 |
| Example 3 | Direct emulsification | Synthetic polyisoprene | 820,000 | 0.19 | — | — | 2.03 | Good | 26 |
| Example 4 | Direct emulsification | SIS | 250,000 | 0.08 | — | — | 2.21 | Good | 27 |
| Comparative Example 1 | Emulsification after dissolution | Synthetic polyisoprene | 820,000 | 0.41 | 700,000 | 0.02 | 2.35 | Fair | 18 |
| Comparative Example 2*[2] | Emulsification after dissolution | Synthetic polyisoprene | 510,000 | 0.41 | 430,000 | 0.02 | 2.40 | Fair | 17 |
| Comparative Example 3 | Emulsification after dissolution | Synthetic polyisoprene | 510,000 | 5.80 | 450,000 | 0.29 | 2.43 | Fair | 17 |
| Comparative Example 4 | Direct emulsification | Synthetic polyisoprene | 800,000 | 0.005 | — | — | 2.01 | Good | 19 |
| Comparative Example 5 | Direct emulsification | Synthetic polyisoprene | 630,000 | 0.40 | — | — | 2.38 | Fair | 18 |

*[1] In Table 1, "Direct emulsification" means production by direct emulsifying each polymer solution obtained through the polymerization step and the antioxidant addition step, without coagulation. In addition, "Emulsification after dissolution" means production by once coagulating each polymer solution obtained through the polymerization step and the antioxidant addition step, and again dissolving the resulting coagulated product in an organic solvent and thereafter emulsifying the resulting solution.

Therefore, while the measurement results in Comparative Examples 1 to 3 where production by "Emulsification after dissolution" was performed were shown with respect to "Polymer solution after coagulation and re-dissolution", the measurement results in Examples 1 to 4 and Comparative Examples 4 and 5 where production by "direct emulsification" was performed were not shown because "Polymer solution after coagulation and re-dissolution" was not present.

*2) In Comparative Example 2, 0.32 parts of 2,6-di-tert-butyl-p-cresol and 0.04 parts of 2,6-di-tert-butyl-4-(4,6-bis(octylthio)-1,3,5-triazine-2-ylamino)phenol (0.36 parts in total) as antioxidants were further added to the resulting emulsion, in providing of the polymer latex.

From Table 1, the resulting polymer latex was excellent in emulsification stability and also provided a dip molded article high in tensile strength in each of Examples 1 to 4 where production was performed by directly emulsifying the polymer solution obtained through the polymerization step and the antioxidant addition step, without coagulation, and the amounts of antioxidants added in the antioxidant addition step were in the predetermined range in the present invention and the D75/D25 of the polymer latex obtained by emulsification was 1.90 or more and 2.30 or less (Examples 1 to 4).

In Examples 1 to 4, the amount of antioxidants added to the polymer solution, and the mount of antioxidants in the polymer solution measured by use of a part of the polymer solution according to high-performance liquid chromatograph (manufactured by silent Technologies: HP1100) were almost the same (much the same is true on Comparative Examples 1 to 5.).

On the other hand, when the polymer solution obtained through the polymerization step and the antioxidant addition step was once coagulated and the coagulated product obtained was again dissolved in the organic solvent, and thereafter the resultant was emulsified, the resulting polymer latex was not sufficient in emulsification stability and the resulting dip molded article was inferior in tensile strength (Comparative Examples 1 to 3).

With respect to Comparative Examples 1 to 3 in which coagulation was once performed, the amounts of antioxidants in "Polymer solution after coagulation and re-dissolution" in such Comparative Examples 1 to 3 were reduced as compared with those in "Polymer solution after polymerization". On the contrary, while an additional antioxidant was added in providing of the polymer latex in Comparative Example 2 and the amounts of antioxidants added to "Polymer solution after coagulation and re-dissolution" were increased in Comparative Example 3, no favorable results could be obtained in both Comparative Examples.

Even when the polymer solution obtained through the polymerization step and the antioxidant addition step was directly emulsified without coagulation, a too low content of antioxidants caused the resulting dip molded article to be inferior in tensile strength (Comparative Example 4).

Furthermore, even when the polymer solution obtained through the polymerization step and the antioxidant addition step was directly emulsified without coagulation, the resulting polymer latex was not sufficient in emulsification stability and also the resulting dip molded article was inferior in tensile strength if the D75/D25 of the polymer latex obtained by emulsification was out of the predetermined range of the present invention (Comparative Example 5).

The invention claimed is:

1. A method for producing a polymer latex, comprising:
   a polymerization step of polymerizing a monomer in an organic solvent to thereby obtain a polymer solution of synthetic polyisoprene and/or a styrene-isoprene-styrene block copolymer;
   an antioxidant addition step of adding an antioxidant to the polymer solution of synthetic polyisoprene and/or a styrene-isoprene-styrene block copolymer at a proportion of 0.01 to 1.00 parts by weight per 100 parts by weight of the synthetic polyisoprene and/or styrene-isoprene-styrene block copolymer; and
   an emulsification step of emulsifying the polymer solution to which the antioxidant is added, in water in the presence of a surfactant, to thereby obtain a polymer latex; wherein
   the emulsification is performed in the emulsification step so that a ratio D75/D25 of a volume particle size D75 at a cumulative frequency of 75% to a volume particle size D25 at a cumulative frequency of 25% of a particle of the synthetic polyisoprene and/or styrene-isoprene-styrene block copolymer included in the polymer latex is 1.90 or more and 2.30 or less.

2. The method for producing a polymer latex according to claim 1, wherein polymerization of the monomer is performed using an alkyllithium polymerization catalyst.

3. The method for producing a polymer latex according to claim 2, wherein a phenol-based antioxidant and a thiobisphenol-based antioxidant are used in combination as the antioxidant.

4. The method for producing a polymer latex according to claim 3, wherein a weight ratio "phenol-based antioxidant: thiobisphenol-based antioxidant" of amounts of the phenol-based antioxidant and the thiobisphenol-based antioxidant used is 60:40 to 95:5.

5. The method for producing a polymer latex according to claim 1, wherein the surfactant is sodium rosinate and/or potassium rosinate.

6. A method for producing a latex composition, comprising a step of adding a crosslinking agent to a polymer latex obtained by the method according to claim 1.

7. A method for producing a dip molded article, comprising a step of dip molding a latex composition obtained by the method according to claim 6.

* * * * *